United States Patent
Drzal et al.

(10) Patent No.: US 8,834,959 B2
(45) Date of Patent: Sep. 16, 2014

(54) METHOD FOR THE PREPARATION OF DOPED SINGLE GRAPHENE SHEETS

(76) Inventors: Lawrence T. Drzal, Okemos, MI (US); Inhwan Do, East Lansing, MI (US); Anchita Monga, Lansing, MI (US)

( * ) Notice: Subject to any disclaimer, the term of this patent is extended or adjusted under 35 U.S.C. 154(b) by 336 days.

(21) Appl. No.: 13/444,114

(22) Filed: Apr. 11, 2012

(65) Prior Publication Data

US 2013/0337351 A1  Dec. 19, 2013

Related U.S. Application Data

(60) Provisional application No. 61/517,801, filed on Apr. 26, 2011.

(51) Int. Cl.
 C01B 31/04 (2006.01)
 C01B 3/00 (2006.01)
 H01G 11/36 (2013.01)
 H01M 4/583 (2010.01)
 H01M 8/04 (2006.01)

(52) U.S. Cl.
 CPC ......... C01B 31/0476 (2013.01); C01B 2204/02 (2013.01); C01B 3/0021 (2013.01); H01G 11/36 (2013.01); H01M 4/583 (2013.01); H01M 8/04216 (2013.01); Y10S 502/526 (2013.01)

USPC ........... 427/123; 427/553; 427/560; 429/512; 118/620; 502/526

(58) Field of Classification Search
 CPC ............ C01B 2204/02; C01B 31/0476; C01B 3/0021; H01G 11/36; H01M 4/583; H01M 8/04216; Y02E 60/325
 USPC ......... 96/108, 153; 95/90; 429/416, 512, 515; 427/123, 553, 560; 428/408; 118/620; 423/648.1; 361/502; 977/734, 773, 977/962; 502/526, 416, 417; 206/0.7
 See application file for complete search history.

(56) References Cited

U.S. PATENT DOCUMENTS

| | | | |
|---|---|---|---|
| 8,611,070 B2* | 12/2013 | Ivanovici et al. | 361/502 |
| 2005/0075245 A1* | 4/2005 | Goddard et al. | 502/417 |
| 2006/0241237 A1* | 10/2006 | Drzal et al. | 524/495 |
| 2010/0081057 A1* | 4/2010 | Liu et al. | 429/231.5 |
| 2010/0092809 A1* | 4/2010 | Drzal et al. | 429/12 |
| 2010/0206363 A1* | 8/2010 | Choi | 136/252 |
| 2010/0222211 A1* | 9/2010 | Drzal et al. | 502/184 |
| 2013/0189580 A1* | 7/2013 | Dai et al. | 429/221 |

* cited by examiner

Primary Examiner — Frank Lawrence, Jr.

(57) ABSTRACT

The synthesis of single graphene sheets decorated with metal or metal oxide nanoparticles, and their uses.

21 Claims, 7 Drawing Sheets

Diluted  XRD

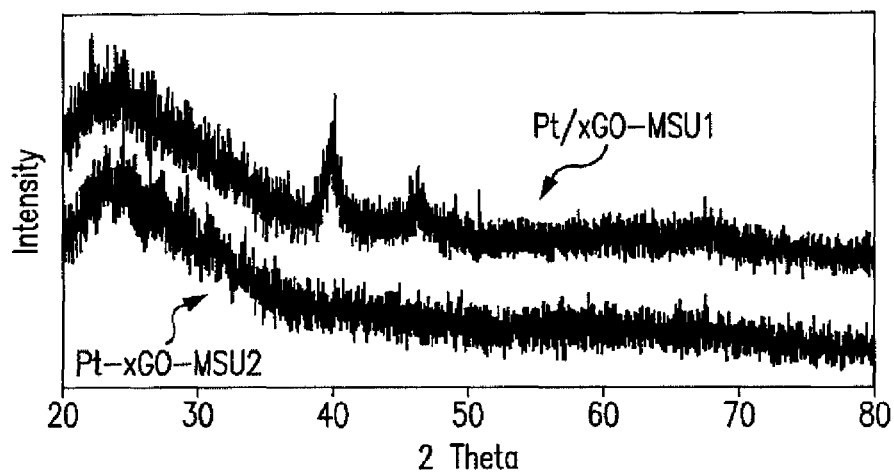
FIG. 6
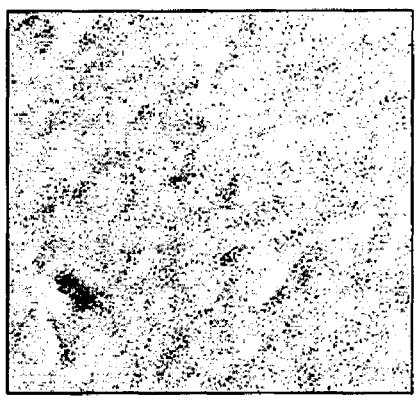
20nm FIG. 7A
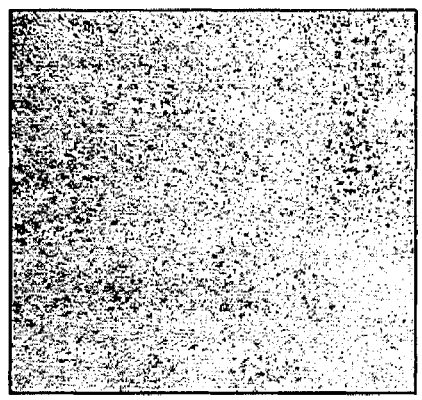
10nm FIG. 7B
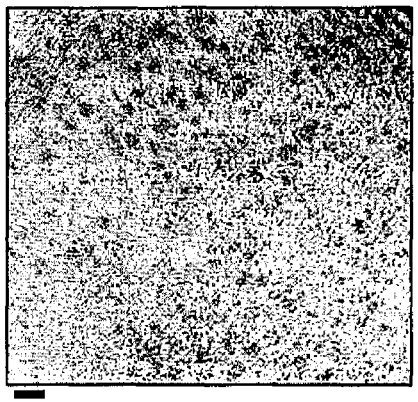
5nm FIG. 7C
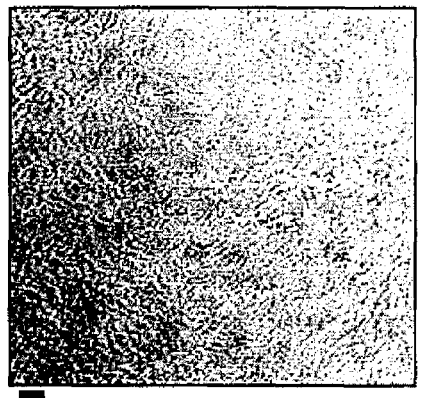
2nm FIG. 7D and then reducing the product of the decorated exfoliated
METHOD FOR THE PREPARATION OF DOPED SINGLE GRAPHENE SHEETS This application is a Utility application claiming priority from U.S. Provisional patent application Ser. No. 61/517,801, filed on Apr. 26, 2011.

BACKGROUND OF THE INVENTION

This patent deals with the synthesis of single graphene sheets decorated with metal or metal oxide nanoparticles, and their uses.

There is much attention given in the prior art publications with respect to graphite oxides intercalated with polymers and surfactants to keep the graphene oxide separated but nobody to date has produced single graphene sheets decorated with metal nanoparticles and their application for energy storage, generation, and conversion devices.

Fuel cells, batteries, super capacitors, and solar cells among others are key devices to meet the increasing energy needs, energy security and concerns compatible with a green environment. Hydrogen storage, for example, is a critical issue for the success of hydrogen economy.

The development of transportable and highly reversible hydrogen storage systems is important to the scale-up of hydrogen energy-based technologies, especially for on-board transportation applications.

Hydrogen, because of its low density, easy and unlimited availability, and non-polluting and renewable characteristics has emerged as a promising energy source; as a solution to the world energy crisis arising from the fast rate of depletion of fossil fuels. The implementation of an efficient, secure and viable hydrogen based system is restricted by certain scientific and technological challenges in hydrogen storage.

On-board application, which currently depends heavily on petroleum based fuels, requires a reliable, lightweight, reversible, safe, efficient and economically viable storage system for hydrogen as a fuel. To make hydrogen fuel economy technically viable and economically feasible, the U.S. Department Of Energy has defined the targets for hydrogen storage within the vehicular constraints of storage efficiency (mass % and volume %), refueling time, safety and cost.

For on-board automotive applications, the storage capacity at ambient conditions has been targeted as 6.5 weight %, (45 kg/m$^3$) and 9 weight %, (81 kg/m$^3$) by 2010 and 2015, respectively.

Among the possible methods of compression, liquefaction and adsorption on solids (carbon nanostructures, zeolites and metal organic frameworks), the last option has caught the attention of researchers because of its safe and relatively simple engineering design. Carbon nanostructures, especially because of their advantages of availability, high surface area, fast kinetics and complete reversibility are in the focus of the scientific community.

New engineered materials are required to accomplish high electro-catalytic activity, high power/current, high capacitance, high solar energy conversion, and high hydrogen uptake for such applications, respectively.

It has been discovered by the inventors herein that single graphene sheets decorated with metal or metal oxide nanoparticles and having high surface areas in excess of 1500 m$^2$/g, provide opportunities for energy conversion and storage devices, for example, hydrogen storage.

SUMMARY OF THE INVENTION

Thus, what is disclosed and claimed herein is a method of preparation of doped single graphene sheets, the method comprising providing graphite and oxidizing the graphite to non-electrically conductive graphite oxide (GO). As used herein, there is a conductivity limit on the products produced herein of less than 1 S/cm.

Thereafter, exfoliating the graphite oxide in a solvent and depositing nanoparticles selected from the group consisting of metals and metal oxides on the exfoliated graphite oxide and then reducing the product of the decorated exfoliated graphite oxide to electrically conductive single graphene sheets.

"Single" as used herein means an average sheet number of less than 2 sheets.

An additional embodiment is a composition of matter which is expanded intercalated exfoliated graphite decorated with metal or metal oxide nanoparticles.

In addition, there is an apparatus assembly for providing expanded intercalated graphite in a gaseous atmosphere using chemical treatment, the apparatus assembly comprising an apparatus for expanding graphite, the apparatus being selected from the group consisting essentially of microwave and radiofrequency.

There is a feed means for feeding the intercalated unexpanded graphite into an enclosed chamber containing gas and a sorting means in the chamber for differentiating between the expanded graphite and the intercalated unexpanded graphite.

There is an exit means from the chamber for receiving the expanded graphite from the sorting means and a means of depositing nanoparticles selected from the group consisting of metals, and metal oxides on the expanded graphite surface.

In addition, the assembly set forth just Supra also has a recycling means for retreating the intercalated unexpanded graphite in the chamber.

Also contemplated within the scope of this invention is a method of manufacturing expanded intercalated graphite decorated with metal or metal oxide nanoparticles, the method comprising providing intercalated graphite, expanding the intercalated graphite using an apparatus selected from the group consisting essentially of microwave and radiofrequency.

Feeding the expanded intercalated graphite into an enclosed chamber containing gas and thereafter, sorting the material in the chamber to provide intercalated expanded graphite. Thereafter, moving the intercalated expanded graphite from the chamber and depositing nanoparticles selected from the group consisting of metals, and metal oxides, on the surface of the expanded intercalated graphite.

In another embodiment, there is a method of conversion of energy, the method comprising utilizing a device containing a doped single graphene sheet as prepared in the method set forth just Supra.

In yet another embodiment, there is a method of storage of energy, the method comprising utilizing a device containing a doped single graphene sheet as prepared in the method set forth just Supra.

Additionally, there is another embodiment which is an energy conversion-storage device containing a doped single graphene sheet as prepared in the method set forth just Supra.

There is a further embodiment which is a method of storing hydrogen gas, the method comprising subjecting hydrogen gas to a conductive single graphene sheet having nanoparticulate metal or metal oxides doped thereon.

BRIEF DESCRIPTION OF THE DRAWINGS

FIG. 6 shows XRD patterns of xGO and xGO-supported platinum samples.

FIG. 7A shows the image of graphite oxide with nickel nanoparticles on the surface wherein the scale bar is at 20 nanometers.

FIG. 7B shows the image of graphite oxide with nickel nanoparticles on the surface wherein the scale bar is at 10 nanometers.

FIG. 7C shows the image of graphite oxide with nickel nanoparticles on the surface wherein the scale bar is at 5 nanometers.

FIG. 7D shows the image of graphite oxide with nickel nanoparticles on the surface wherein the scale bar is at 2 nanometers.

DETAILED DESCRIPTION OF THE INVENTION

Figure 1:
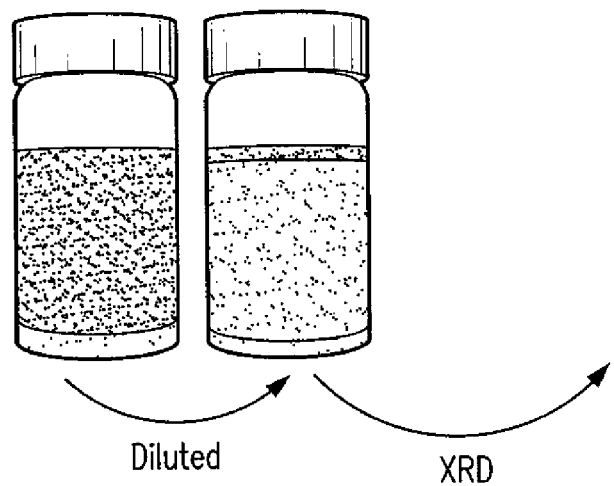
FIG. 1 shows graphite oxide dispersed in water.

The most important feature of this invention is to synthesize new engineered nanocomposites by depositing metal nanoparticles onto exfoliated graphite oxide and reducing that material to single graphene sheet which is electrically conductive and has extremely high surface area. The performance of these nanocomposites can be altered by introduction of other metal and metal oxide elements and also can be tuned by controlling the size and loading level of the metal and metal oxide nanoparticles.

One of the major end uses for the products of this invention is hydrogen storage. Carbon-based materials are potential candidates for hydrogen storage owing to their cheap availability in large quantities and low molecular weight with respect to metals. Nano scale materials show distinct advantageous thermodynamic and kinetic properties in comparison to their bulky counterparts. In terms of hydrogen adsorption, the reduced length scale improves the kinetics by increasing the diffusion rate and decreasing the diffusion length.

Theoretically, graphitic substrates have a huge potential for adsorption (physisorption) of large quantities of hydrogen storage, provided the surface of both sides of every single graphene layer is available for sorption. Based on molecular orbital studies and DFT calculations, it has been discovered that when hydrogen is physisoborbed on one side of the graphene layer, similar attraction for hydrogen is observed on the other side as well. Various simulation studies have shown the potential of carbon nanostructures for hydrogen storage, provided the single layer graphene sheets are separated from each other to give enough room for the hydrogen molecules.

The unexpanded graphene layered structures are separated by approximately 3.4 angstroms and this is not enough space to accommodate the hydrogen molecules. Hence, the structure needs to be modified to increase the interlayer spacing to include two layers of sorbed hydrogen. This increase is limited, keeping in mind that at very large separation distances, the binding energy for the second layer will become really low. Hence a multilayer graphene structure has significant potential for hydrogen storage, provided the interplanar spacing is optimized to include two layers of sorbed hydrogen. Different techniques such as introducing spacers and graphite intercalation with other chemicals can be used to synthesize a multilayer nanostructure of optimized spacing.

Introducing metal dopants in the graphene layer system can serve as spacers, hence increasing the interlayer spacing, along with the geometrical modification induced by spaces. Further advantage can be taken by choosing a suitable metal which can assist in hydrogen uptake by promoting reaction kinetics or by spillover mechanisms. Various ab initio studies and simulations based on density function calculations have indicated the possibility of achieving Department Of Energy (DOE) targets for storage capacity at high metal coverage. Different metal dopants such as precious metals, for example, platinum, palladium, rubidium; transition metals such as titanium, nickel, or alkali metals like lithium, sodium, and the like have been discovered by the inventors herein to enhance hydrogen storage.

Additional energy generation, storage and conversion devices that can benefit from this technology are, for example, solar cells, super capacitors, ultra super capacitors, fuel cells, batteries, especially lithium ion batteries, and the like.

Advantages of the use of the products of this invention are, for example, relatively less expensive processes for producing doped graphite nanoplatelets with metal nanoparticles or their oxides, controlled doping of metal or oxide nanoparticles, in terms of their size and concentration, and multifaceted three dimensional nanoarchitectured structures that have potential for applications in various applications such as super capacitors, hydrogen storage, and the like.

Materials

Generally, three grams of natural graphite flake about 200 μm in average size was oxidized in an acid solution created by 3 ml. of 60% $HNO_3$, 60 ml. 96% $H_2SO_4$, and 4 grams of $KMnO_4$, resulting in graphite oxide (GO)formation. Graphite oxide was exfoliated in water, followed by impregnation with a metal salt. Then the metal salt was reduced via microwave irradiation in the presence of graphite oxide, which is identified as exfoliated graphite oxide-supported (xGO-supported) metal nanoparticles or metal/xGO nanocomposites.

The xGO decorated with metal nanoparticles is reduced chemically in hydrazine, or some other reducing agent, or, thermally at high temperatures of greater than 1000° C., which converts the electrically nonconductive xGO to conductive graphite which is only one atomic layer in thickness. The product created is single graphene sheet {(SG)-supported} metal nanoparticles or metal/single graphene sheet nanocomposites. Exfoliated graphite nanoplatelets (xGnP) can be used as a starting material. If the xGnP is used, it can be oxidized in a milder condition than the graphite flake but the subsequent procedures are the same as the graphite flake.

Example 1

Natural graphite flake about 200 µm in average size were oxidized in an acid solution created by 60% $HNO_3$, 96% $H_2SO_4$, and $KMnO_4$, resulting in graphite oxide formation. Graphite oxide was exfoliated in water, followed by impregnation with a metal salt. Then the metal salt was reduced via microwave irradiation in the presence of graphite oxide (GO), which material is identified herein as exfoliated graphite oxide-supported (xGO-supported) metal nanoparticles or metal/xGO nanocomposites.

The xGO decorated with metal nanoparticles was reduced chemically in hydrazine or thermally at high temperature of greater than 1000° C., which converted the electrically nonconductive xGO to conductive graphite (graphene) which was only one atomic layer in thickness. The product created was single graphene sheet (SG)-supported metal nanoparticles or metal/single graphene sheet nanocomposites.

Exfoliated graphite nanoplatelets (xGnP) can be used as a starting material. If the xGnP is used, it can be oxidized in a milder condition than the graphite flake but the subsequent procedures are the same as the graphite flake.

FIG. 1 is shows a stable solution of graphite oxide dispersed in water. The left and right images represent the concentrated and the diluted graphite oxide in water, respectively. The dispersion of graphite oxide in water gave typical yellowish brown color. This Figure indicates that graphite oxide can be produced via a process of combining mild oxidation and ultrasonication of graphite flakes.

Figure 2:
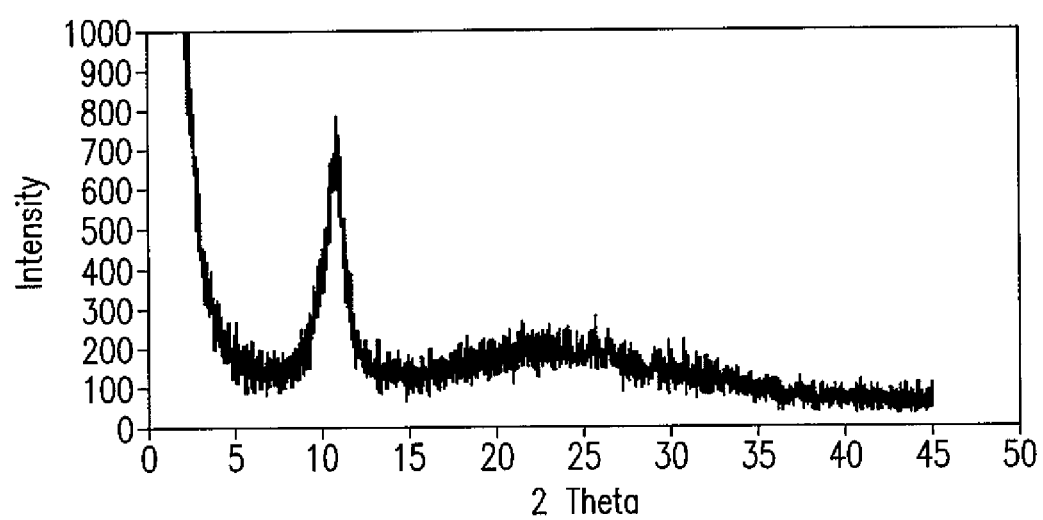
FIG. 2 shows an X-ray diffraction pattern of the graphite oxide of FIG. 1.

FIG. 2 shows an X-ray diffraction pattern of the graphite oxide of FIG. 1. A large XRD peak around $2\theta=11$ identifies the formation of graphite oxide and the broad peak $2\theta=11$ to 32 is a result of the bare glass slide.

Figure 3A:
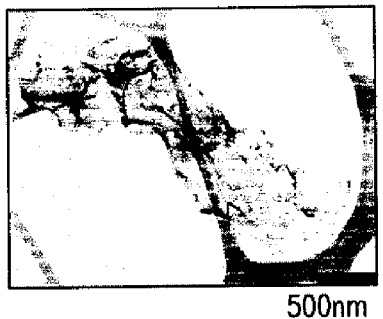
FIG. 3A to 3D are TEM images of graphite oxide decorated with platinum nanoparticles wherein they were taken at low and medium magnification.
Figure 3B:
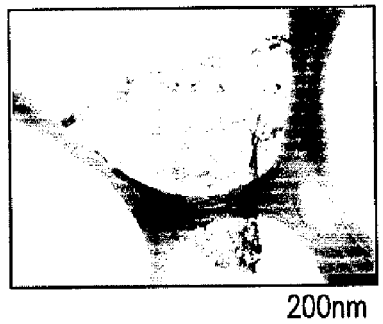
Figure 3C:
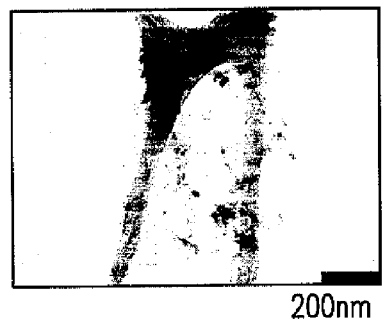
Figure 3D:
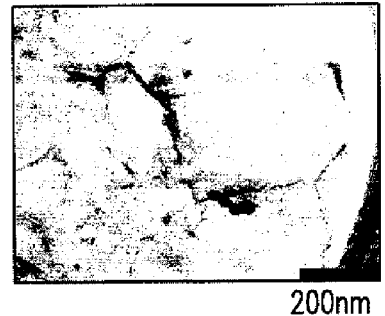
Figure 3E:
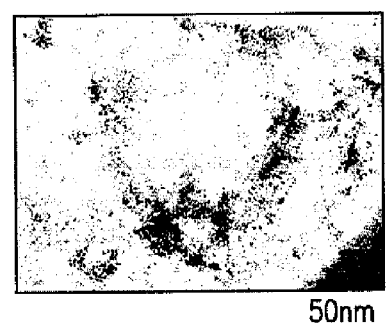
FIG. 3E is a higher magnification image of graphite oxide with platinum nanoparticles on the surface.
Figure 3F:
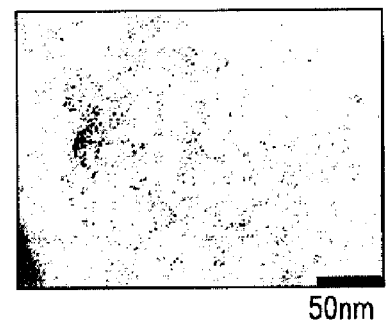
FIG. 3F is a higher magnification image of graphite oxide with platinum nanoparticles on the surface.

TEM images of graphite oxide decorated with platinum nanoparticles are shown in FIGS. 3A to 3D. It was found from the TEM images taken at low and medium magnification that individual graphite oxide was very transparent and many wrinkles were formed. Black spots represent nanosized platinum particles. Individual platinum particles without aggregation were well dispersed on the graphite oxide surface as shown in the higher magnification images, namely, FIGS. 3E and 3F.

Figure 4:
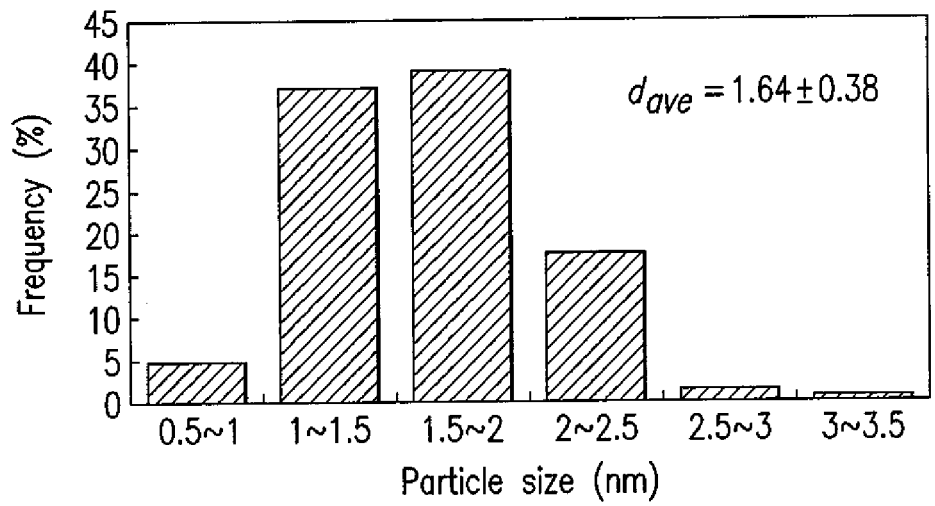
FIG. 4 is a graph of the particle measurements of the platinum shown in FIGS. 3A to 3F.

The average size of the platinum nanoparticles on the surface of the graphite oxide was 1.64 nm plus or minus 0.38 nm based on the measurements of the diameter of approximately 150 platinum particles (FIG. 3G), which was smaller than that of platinum nanoparticles decorated on exfoliated graphite fabricated under the same conditions. FIG. 4 is a graph of the particle measurements of the platinum shown in FIGS. 3A to 3F.

Figure 5:
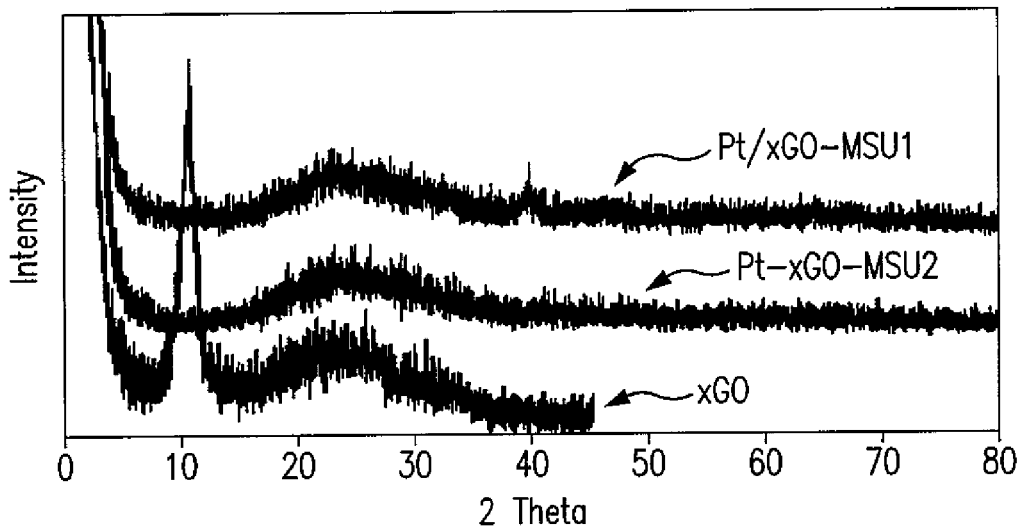
FIG. 5 is XRD patterns for two platinum/graphite oxide (xGO) nanocomposite samples which were made under different conditions.

XRD patterns for two platinum/xGO nanocomposite samples which were made in different conditions are shown in FIG. 5. While graphite oxide has a typical peak around $2\theta=11$, the peak at that angle for graphite oxide decorated with platinum particles disappeared, suggesting the formation of the single exfoliated graphite oxide. This results from the presence of platinum nanoparticles which keeps the xGO permanently separated. The platinum/xGO-MSU-1 sample possessed the characteristic peaks of an fcc platinum structure at $2\theta=40°$ and 47°. The platinum/xGO-MSU-2 sample showed only a broad peak due to the very fine platinum formation, agreeing with FIG. 3.

FIG. 6 shows XRD patterns of xGO and xGO-supported platinum samples.

Example 2

This metal doped xGnP was prepared by the microwave assisted polyol process, in which glycols of different compositions can be used to synthesize metal nanoparticles by reducing them from their salts, with occasional modifications induced by the use of reducing agents and stabilizers.

FIGS. 7A to 7D show the images of nickel nanoparticle doped xGnP-15 platelets (Xg Sciences, East Lansing, Mich.) at different magnifications, from which one can observe that the average size of these nickel nanoparticles is in the range of 3 to 4 nm.

The presence of nickel metal nanoparticles on xGnP platelets was confirmed by multiple characterization techniques including X-ray photoelectron spectroscopy, X-ray diffraction analysis, electron energy loss spectroscopy.

Figure 8A:
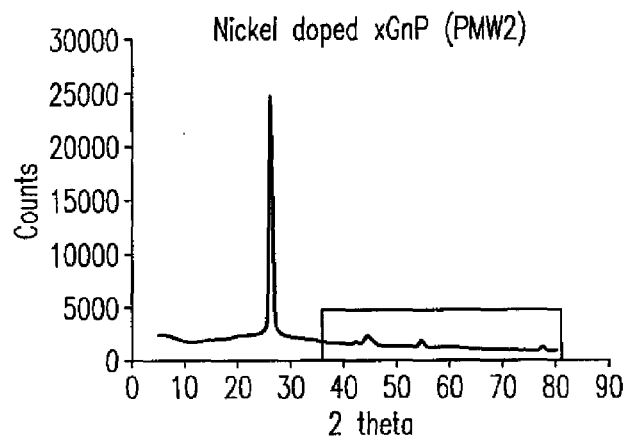
FIG. 8A shows an XRD pattern of nickel doped xGnP in a complete range.

Shown in FIG. 8A is the X-ray diffraction analysis of nickel doped xGnP material, which shows the peaks for xGnP at 26°, 55°, and peaks confirming nickel nanoparticles at 43.29°, 62.88°, and 79.41°.

Figure 8B:
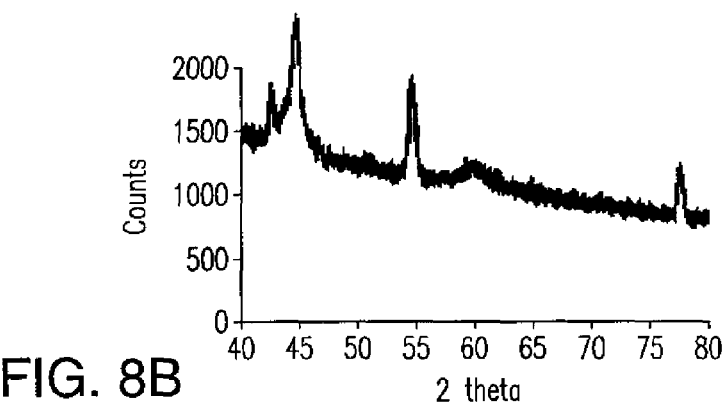
FIG. 8B shows an XRD pattern of the nickel doped XRD pattern of FIG. 8A wherein there is shown a zoomed portion from the open block of FIG. 8A.

FIG. 8B shows an XRD pattern of the nickel doped XRD pattern of FIG. 8A wherein there is shown a zoomed portion from the open block of FIG. 8A.

Figure 9:
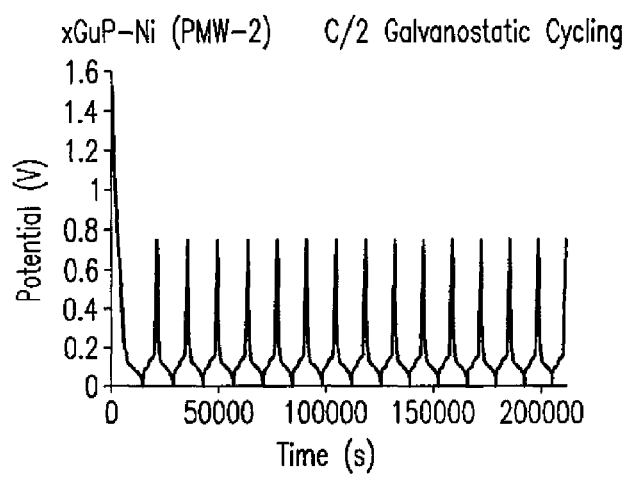
FIG. 9 is a graph of the raw galvanostatic data.
Figure 10:
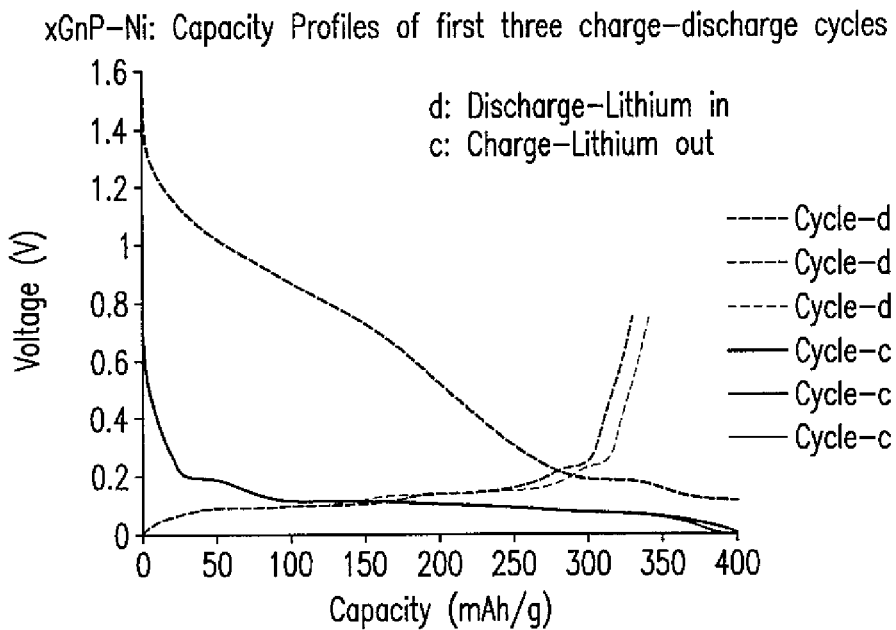
FIG. 10 shows the capacity profiles of first three charge-discharge cycles.
Figure 11:
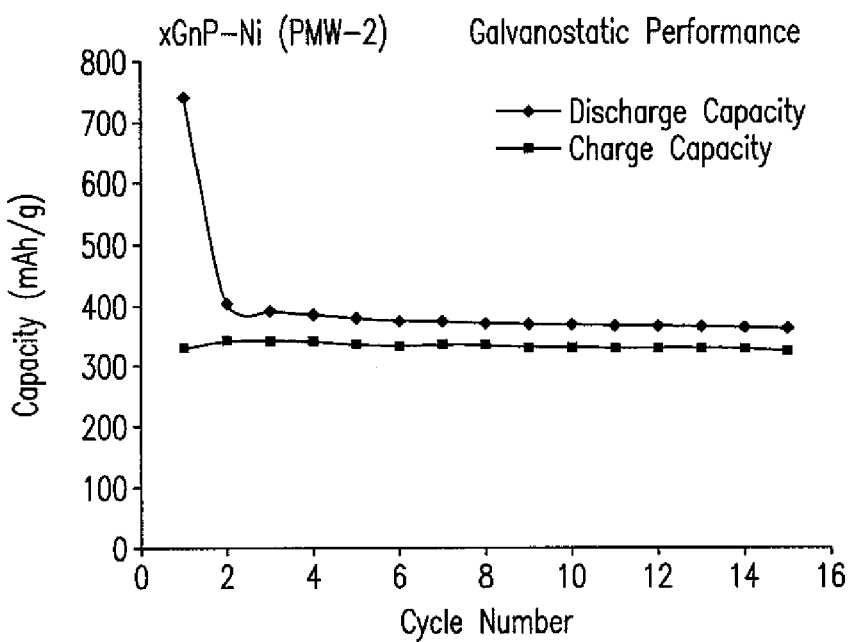
FIG. 11 shows the cycle performance.

With regard to FIG. 9, galvanostatic cycling was done at C/2 charge rate for this material and the representative data as shown in FIGS. 10 and 11. It is expected that the presence of these metal nanoparticles will facilitate lithium diffusion in and out of the electrode of batteries, thus enabling better performance at faster charge rates.

The capacity values at 0.5° C. or C/2 charge rate (FIG. 10) still remains close to the theoretical capacity storage value for graphite. It should be noted that in all these calculations, the loading of the active material is the weight of the composite, which includes metal dopants, xGnP and the binder. So, in terms of performance of the nanographitic assembly, potential improvement is expected in xGnP performance by metal doping.

Example 3

Figure 12A:
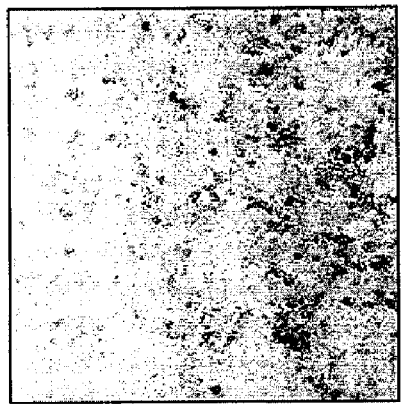
FIG. 12A shows a high resolution image of Sn doped xGnP material wherein the scale bar is at 5 nanometers.
Figure 12B:
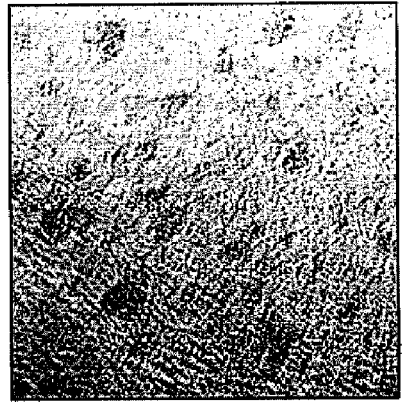
FIG. 12B shows a high resolution image of Sn doped xGnP material wherein the scale bar is at 2 nanometers.

Using the same processing methodology, with controlled reaction conditions, Sn based nanoparticles were prepared by using tin(II) chloride dehydrate as the metal precursor. Tin as a metal dopant will provide some contribution to the capacity because of its inherent interaction with lithium, which is expected to increase the capacity of the anode material. FIGS. 12A and 12B show some high resolution images of Sn doped xGnP material.

Figure 13A:
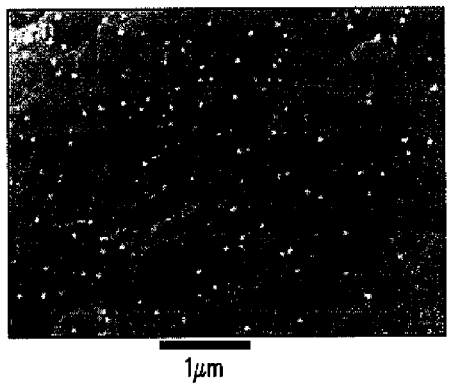
FIG. 13A shows xGnP nanoparticles doped with nickel nanoparticles of size 70 to 80 nanometers wherein the scale bar is at 1 μm.
Figure 13B:
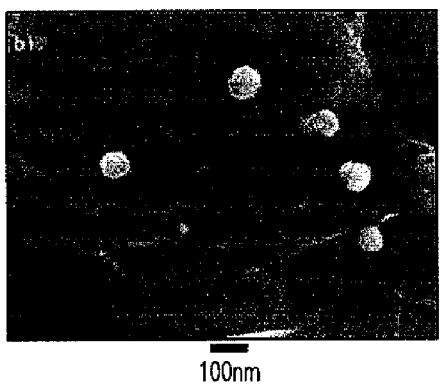
FIG. 13 B shows xGnP nanoparticles doped with nickel nanoparticles of size 70 to 80 nanometers wherein the scale bar is at 100 nanometers.

FIGS. 13A and 13B show xGnP nanoparticles dope with nickel nanoparticles of size 70 to 80 nanometers wherein the scale bar on FIG. 13A is at 1 µm and the scale bar on FIG. 13B is at 100 nanometers.

Figure 14A:
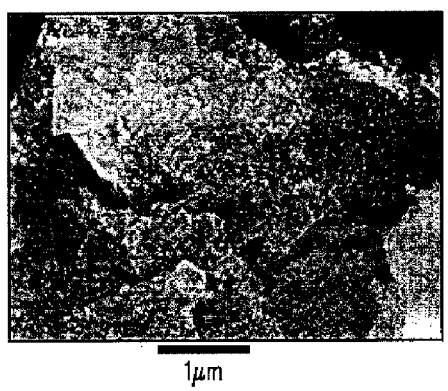
FIG. 14A shows xGnP nanoparticles doped with nickel nanoparticle clusters of 40 to 50 nanometer size wherein the scale bar is at 1 μm.
Figure 14B:
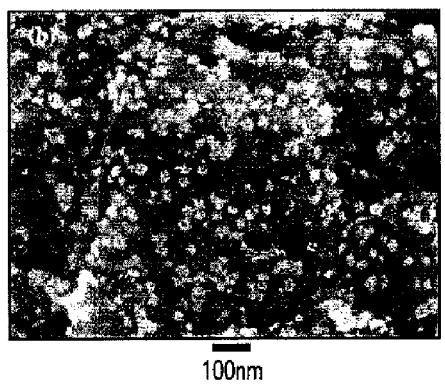
FIG. 14B shows xGnP nanoparticles doped with nickel nanoparticle clusters of 40 to 50 nanometer size wherein the scale bar is at 100 nanometers.

FIGS. 14A and 14B show xGnP nanoparticles doped with nickel nanoparticles clusters of 40 to 50 nanometer size wherein in FIG. 14A, the scale bar is at 1 μm and in FIG. 14B, the scale bar is at 100 nanometers.

What is claimed is:

1. A method of preparation of doped single graphene sheets, the method comprising:
   A. providing graphite;
   B. oxidizing the graphite to non-electrically conductive graphite oxide;
   C. exfoliating the graphite oxide in a solvent;
   D. depositing nanoparticles selected from the group consisting of
      metals, and,
      metal oxides, on the product of C., and,
   E. reducing the product of D. to electrically conductive single graphene sheets.

2. The method as claimed in claim 1 wherein the oxidation of the graphite to graphite oxide is carried out using mild oxidation and ultrasonication of graphite flakes.

3. The method of preparation as claimed in claim 1 wherein the single graphene sheets have a surface area of at least 1500 $m^2/g$.

4. The method of preparation as claimed in claim 1 wherein the reduction in step E. is carried out using a process selected from the group consisting essentially of
   chemical,
   electrical, and
   temperatures of 1000° C. or higher.

5. A method of conversion of energy, said method comprising utilizing a device containing a doped single graphene sheet as prepared in claim 1.

6. A method of storage of energy, said method comprising utilizing a device containing a doped single graphene sheet as prepared in claim 1.

7. An energy conversion/storage device containing a doped single graphene sheet as prepared in claim 1.

8. An energy conversion/storage device as claimed in claim 7 that is a fuel cell.

9. An energy conversion/storage device as claimed in claim 7 that is a battery.

10. An energy conversion/storage device as claimed in claim 9 wherein the battery is a lithium ion battery.

11. An energy conversion/storage device as claimed in claim 7 that is a super capacitor.

12. An energy conversion/storage device as claimed in claim 7 that is an ultra super capacitor.

13. An energy conversion/storage device as claimed in claim 7 that is a solar cell.

14. A method of storing hydrogen gas, the method comprising subjecting hydrogen gas to a conductive single graphene sheet having nanoparticulate metal or metal oxides doped thereon.

15. The method as claimed in claim 1 wherein the particle size of the metal or metal oxide nanoparticles is controlled.

16. The method as claimed in claim 1 wherein the volume of metal or metal oxide nanoparticles deposited on the graphite oxide is controlled.

17. A method of preparation of doped single graphene sheets, the method comprising:
   A. providing graphite;
   B. oxidizing the graphite to non-electrically conductive graphite oxide;
   C. exfoliating the graphite oxide in a solvent;
   D. depositing nanoparticles selected from the group consisting of
      metals, and,
      metal oxides, on the product of C., by treating predetermined metal salts with microwave energy in the presence of glycols, and,
   E. reducing the product of D to electrically conductive single graphene sheets.

18. A composition of matter which is expanded xGNp decorated with metal or metal oxide nanoparticles.

19. An apparatus assembly for providing expanded intercalated graphite in a gaseous atmosphere using chemical treatment, the apparatus assembly comprising:
   a. an apparatus for expanding graphite, the apparatus selected from the group consisting essentially of:
      i. microwave and,
      ii. radiofrequency;
   b. a feed means for feeding the intercalated unexpanded graphite into an
   c. enclosed chamber;
   d. sorting means in the chamber for differentiating between the expanded graphite and the intercalated unexpanded graphite;
   e. exit means from the chamber for receiving the expanded graphite from the sorting means;
   f. a means of depositing nanoparticles selected from the group consisting of metals, and metal oxides on the expanded graphite.

20. The assembly as claimed in claim 19 wherein, in addition, there is a recycling means for retreating the intercalated unexpanded graphite in the chamber.

21. A method of manufacturing expanded intercalated graphite decorated with metal or metal oxide nanoparticles, the method comprising:
   a. providing intercalated graphite;
   b. expanding the intercalated graphite using an apparatus selected from the group consisting essentially of:
      i. microwave and,
      iii. radiofrequency;
   c. feeding the expanded intercalated graphite into an enclosed chamber containing gas;
   d. sorting the material in the chamber to provide intercalated expanded graphite;
   e. moving the intercalated expanded graphite from the chamber;
   f. depositing nanoparticles selected from the group consisting of metals, and metal oxides on the surface of the expanded intercalated graphite.

* * * * *